US010498971B2

(12) United States Patent
Bagaria et al.

(10) Patent No.: US 10,498,971 B2
(45) Date of Patent: Dec. 3, 2019

(54) SYSTEMS AND METHODS FOR HIGH-DYNAMIC RANGE IMAGING

(71) Applicant: QUALCOMM Incorporated, San Diego, CA (US)

(72) Inventors: Lucky Bagaria, Hyderabad (IN); Nitin Srivastava, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 105 days.

(21) Appl. No.: 15/803,505

(22) Filed: Nov. 3, 2017

(65) Prior Publication Data

US 2019/0138259 A1 May 9, 2019

(51) Int. Cl.
*H04N 5/235* (2006.01)
*G06F 3/14* (2006.01)
*G06T 5/00* (2006.01)
*G09G 5/14* (2006.01)
*H04N 5/232* (2006.01)
*G06T 5/50* (2006.01)

(52) U.S. Cl.
CPC ......... *H04N 5/2355* (2013.01); *G06F 3/1454* (2013.01); *G06T 5/009* (2013.01); *G06T 5/50* (2013.01); *G09G 5/14* (2013.01); *H04N 5/23248* (2013.01); *G06T 2207/10144* (2013.01); *G06T 2207/20208* (2013.01); *G06T 2207/20221* (2013.01)

(58) Field of Classification Search
CPC .... G06F 3/1454; G09G 5/14; H04N 5/23248; H04N 5/2355; G06T 5/009; G06T 2207/20208
See application file for complete search history.

(56) References Cited

U.S. PATENT DOCUMENTS

| 8,570,396 | B2 | 10/2013 | Rapaport |
| 8,891,955 | B2 | 11/2014 | Whitham |
| 9,332,210 | B2 | 5/2016 | Demandolx et al. |
| (Continued) | | | |

FOREIGN PATENT DOCUMENTS

EP 2763396 A1 8/2014

OTHER PUBLICATIONS

International Search Report and Written Opinion—PCT/US2018/058774—ISA/EPO—dated Jan. 22, 2019.

*Primary Examiner* — Jason A Flohre
(74) *Attorney, Agent, or Firm* — Paradice & Li LLP

(57) ABSTRACT

Aspects of the present disclosure relate to systems and methods for generating High-Dynamic Range (HDR) images. An example device may include a camera, one or more processors, and a memory. The memory may include instructions that, when executed by the one or more processors, cause the device to determine, from a preview image captured with an initial exposure value by a camera, a first exposure value for capturing a reference image, and a second exposure value for capturing a first non-reference image, wherein the second exposure value is based on a difference between the initial exposure value and the first exposure value. Execution of the instructions may further cause the device to capture the reference image using the first exposure value, capture the first non-reference image using the second exposure value, and blend the reference image and the first non-reference image in generating an HDR image.

19 Claims, 12 Drawing Sheets

(56) References Cited

U.S. PATENT DOCUMENTS

| | | |
|---|---|---|
| 9,407,831 B2 | 8/2016 | Wong et al. |
| 9,699,482 B2 | 7/2017 | Mertens et al. |
| 9,704,250 B1 | 7/2017 | Shah et al. |
| 2008/0187235 A1 | 8/2008 | Wakazono et al. |
| 2009/0086085 A1* | 4/2009 | Asoma ................. H04N 5/2355 348/362 |
| 2010/0215348 A1* | 8/2010 | Saito ................... H04N 5/2355 386/224 |
| 2015/0244917 A1* | 8/2015 | Huang ................. H04N 5/2353 348/222.1 |
| 2015/0296114 A1 | 10/2015 | Yang et al. |
| 2016/0093029 A1 | 3/2016 | Micovic et al. |
| 2016/0358584 A1 | 12/2016 | Greenebaum et al. |
| 2017/0034413 A1* | 2/2017 | Lin .................... H04N 5/35554 |
| 2017/0064179 A1 | 3/2017 | Richards |
| 2017/0187938 A1* | 6/2017 | Ichihara .............. H04N 5/2351 |
| 2017/0214847 A1 | 7/2017 | Wu |

\* cited by examiner

SYSTEMS AND METHODS FOR HIGH-DYNAMIC RANGE IMAGING

TECHNICAL FIELD

This disclosure relates generally to systems for image capture devices, and specifically to high-dynamic range (HDR) imaging.

BACKGROUND OF RELATED ART

Devices including or coupled to one or more digital cameras use a camera sensor to capture light information for generating digital images. Camera sensors for digital cameras typically capture a limited range of brightness or light intensity when capturing an image frame of a scene. A conventional image captured with a limited or standard range of brightness is called a limited-dynamic range (LDR) image or a standard-dynamic range (SDR) image.

Many devices capture an LDR or SDR image using an automatically determined exposure value (e.g., an auto-exposure (AE) setting) and an undesirably limited range of brightness captured for the captured image. For example, although a person is able to perceive a large range of brightness and light effects of a scene (such as shadows and color contrasts), a captured LDR or SDR image may appear muted or dull because of its limited range of brightness. To compensate for the limited range of brightness associated with such captured images, many digital cameras perform High-Dynamic Range (HDR) imaging for capturing images.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for generating High-Dynamic-Range (HDR) images. In some example implementations, a device may include a camera, one or more processors, and a memory. The memory may include instructions that, when executed by the one or more processors, cause the device to determine, from a preview image captured with an initial exposure value by the camera, a first exposure value for capturing a reference image, and determine a second exposure value for capturing a first non-reference image, wherein the second exposure value is based on a difference between the initial exposure value and the first exposure value. Execution of the instructions may further cause the device to capture the reference image using the first exposure value, to capture the first non-reference image using the second exposure value, and to blend the reference image and the first non-reference image to generate an HDR image.

In another example, a method is disclosed. The example method includes determining, from a preview image captured with an initial exposure value by a camera, a first exposure value for capturing a reference image, determining a second exposure value for capturing a first non-reference image, wherein the second exposure value is based on a difference between the initial exposure value and the first exposure value, capturing the reference image using the first exposure value, capturing the first non-reference image using the second exposure value, and blending the reference image and the first non-reference image to generate an HDR image.

In another example, a non-transitory computer-readable medium is disclosed. The non-transitory computer-readable medium may store instructions that, when executed by a processor, cause a device to perform operations including determining, from a preview image captured with an initial exposure value by a camera, a first exposure value for capturing a reference image, determining a second exposure value for capturing a first non-reference image, wherein the second exposure value is based on a difference between the initial exposure value and the first exposure value, capturing the reference image using the first exposure value, capturing the first non-reference image using the second exposure value, and blending the reference image and the first non-reference image to generate an HDR image.

In another example, a device is disclosed. The device includes means for determining, from a preview image captured with an initial exposure value by a camera, a first exposure value for capturing a reference image, means for determining a second exposure value for capturing a first non-reference image, wherein the second exposure value is based on a difference between the initial exposure value and the first exposure value, means for determining a third exposure value for capturing a second non-reference image, wherein the third exposure value is based on the difference between the initial exposure value and the first exposure value, means for capturing the reference image using the first exposure value, means for capturing the first non-reference image using the second exposure value, means for capturing the second non-reference image using the third exposure value, and means for blending the reference image, the first non-reference image, and the second non-reference image to generate an HDR image.

BRIEF DESCRIPTION OF THE DRAWINGS

Aspects of this disclosure are illustrated by way of example, and not by way of limitation, in the figures of the accompanying drawings and in which like reference numerals refer to similar elements.

DETAILED DESCRIPTION

Figure 1:
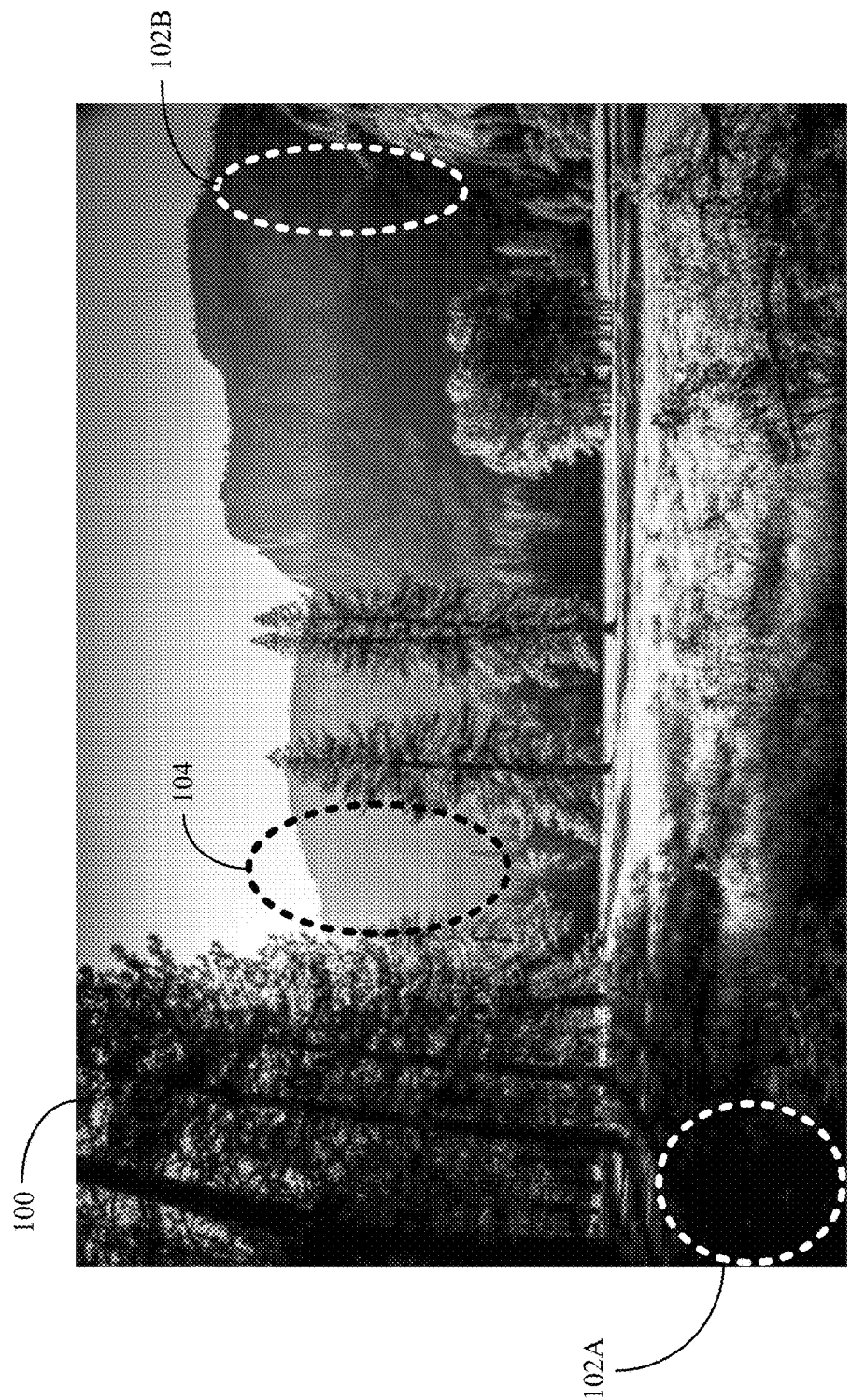
FIG. 1 illustrates an example limited-dynamic range (LDR) image captured by a camera.

Aspects of the present disclosure may be used for generating HDR images. In some implementations, a device may capture multiple LDR or SDR images having different ranges of brightness, and then blend the multiple captured images to generate an HDR image. By blending the multiple captured images having different ranges of brightness, the resulting HDR image may have a larger range of brightness than conventional LDR or SDR images. In the following description, a single image captured using a camera sensor's standard or limited range of brightness is referred to as a LDR image. However, the term "LDR image" is for explanation purposes and is not intended to limit aspects of the disclosure. For example, a LDR image may be any image having a range of brightness that is than the range of brightness for an associated HDR image.

A digital camera sensor typically captures a limited range of brightness for a LDR image. To capture different ranges of brightness for multiple LDR images, digital camera sensor may capture the multiple LDR images using different exposure values. Exposure values (EV) may be expressed in terms of f-values or stops, and may be measured as an amount of brightness for a unit of area (such as in units of candelas per square feet ($cd/ft^2$) or candelas per square meter ($cd/m^2$)). One stop above or more refers to a doubling of the amount of light received by a camera sensor (such as 2*x $cd/ft^2$), and one stop below or less refers to a halving of the amount of light received by the camera sensor (such as x/2 $cd/ft^2$). A device may adjust an exposure value (and thus the amount of light measured by a camera sensor) by adjusting the camera shutter speed, adjusting the camera sensor sensitivity (e.g., measured in ISO), and/or adjusting the camera aperture size.

Many devices automatically determine an exposure value for capturing a LDR image (such as an auto-exposure (AE) setting). The AE setting may be used to adjust camera settings so that an image to be captured will have a target brightness. For example, when a camera sensor is activated, information from the camera sensor may be used to generate a preview stream including a plurality of preview images. Measurements from the preview stream (such as color contrast, measured brightness, and so on) may be used by the device to determine initial settings for capturing an image. The preview stream may also be displayed to assist a user in positioning the device or changing one or more of the camera settings. In some aspects, a default exposure value (such as a default stop) may be set so that the device captures a LDR image with an overall target brightness. The device may recursively measure the brightness of a preview image and adjust the exposure value (by adjusting one or more camera settings) until the measured brightness of the preview image equals the target brightness for the LDR image to be captured. The preview image may also be displayed to assist a user in positioning a camera and/or adjusting one or more camera settings. For example, many devices allow a user to set an exposure value for capturing a LDR image (such as by selecting a stop).

Brightness may be any measure of light intensity received by a camera sensor. For example, brightness may be expressed in terms of a luma or luminance. A luminance for an image may be measured in candelas per square meter ($cd/m^2$), nits, stilbs, or other suitable units indicative of a level of brightness. Although the examples described herein use the term brightness for illustrative purposes, aspects of the present disclosure may use any measurement of brightness or light intensity for an image.

FIG. 1 illustrates an example LDR image 100 with a target brightness captured by a camera using a determined exposure value. Since the camera may capture a limited range of brightness, areas of the captured LDR image 100 having low levels of brightness of the scene in regions 102A and 102B and an area of the captured LDR image 100 having a high level of brightness of the region 104 may appear saturated or washed out. For example, details of the scene corresponding to regions 102A and 102B may be muted or not visible because the range of brightness with which the scene is captured may be above or greater than the level of brightness of the regions 102A and 102B in the actual scene. Conversely, details of the scene corresponding to region 104 may be muted or not visible because the range of brightness with which the scene is captured may be below or less than the level of brightness of the region 104 in the actual scene.

Figure 2:
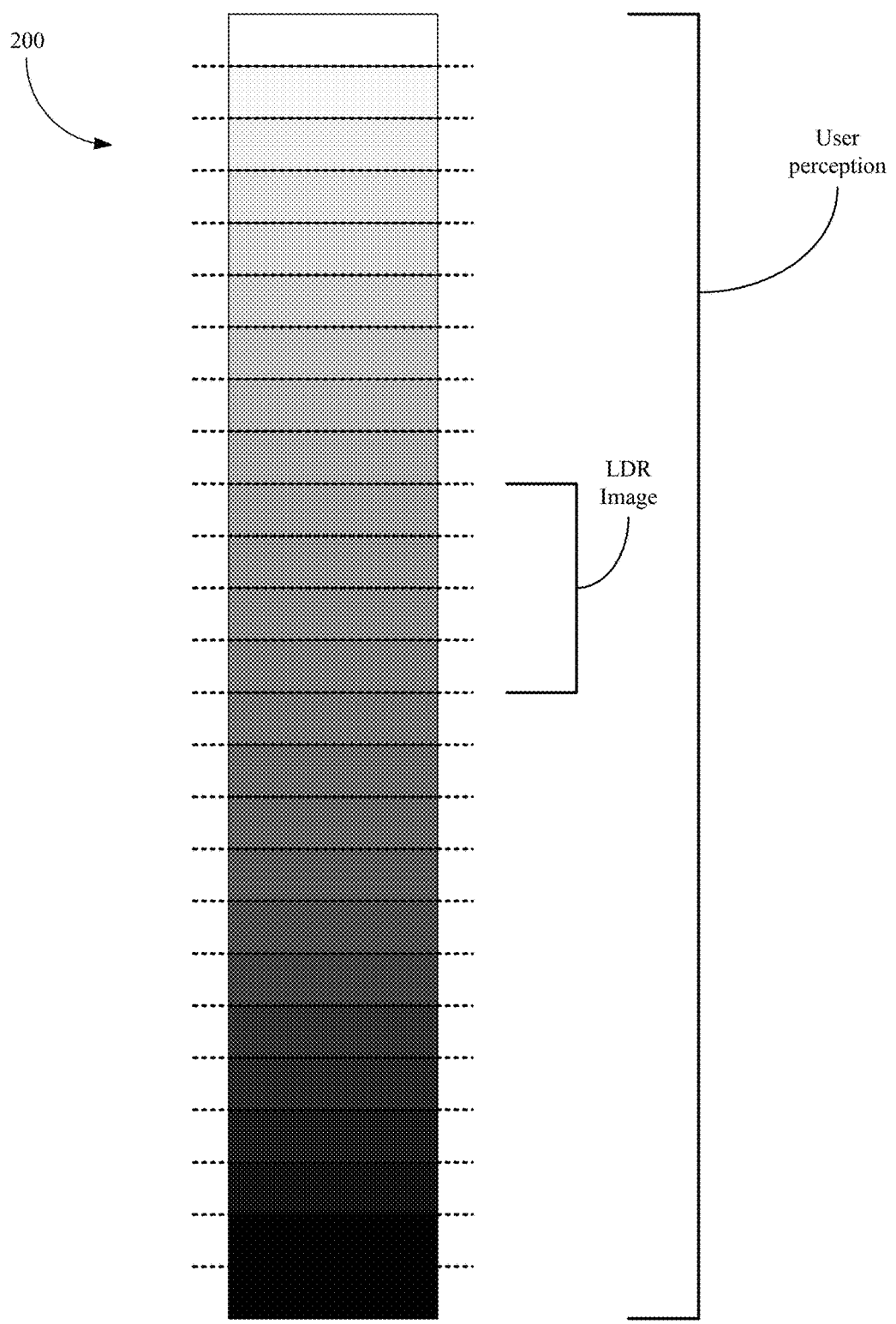
FIG. 2 illustrates a brightness range able to be perceived by a user and an example brightness range captured by a camera for the LDR image in FIG. 1.

FIG. 2 illustrates a brightness range 200 corresponding to 24 example stops perceivable by a user. FIG. 2 also illustrates an example brightness range corresponding to an example 5 stops that may be used to capture the LDR image 100 in FIG. 1. An average person can perceive a greater range of brightness or light intensity than may be captured by a typical camera sensor. For example, although a person may be able to perceive a range of brightness corresponding to 24 stops for a camera, the camera's sensor typically captures a much smaller range (such as 5 stops), as illustrated in FIG. 2. Thus, the brightness of the scene in regions 102A and 102B may correspond to a stop less than or under the stops corresponding to the brightness range for the LDR image 100, and the brightness of the scene in region 104 may correspond to a stop greater than or above the stops corresponding to the brightness range for the LDR image 100.

Figure 3:
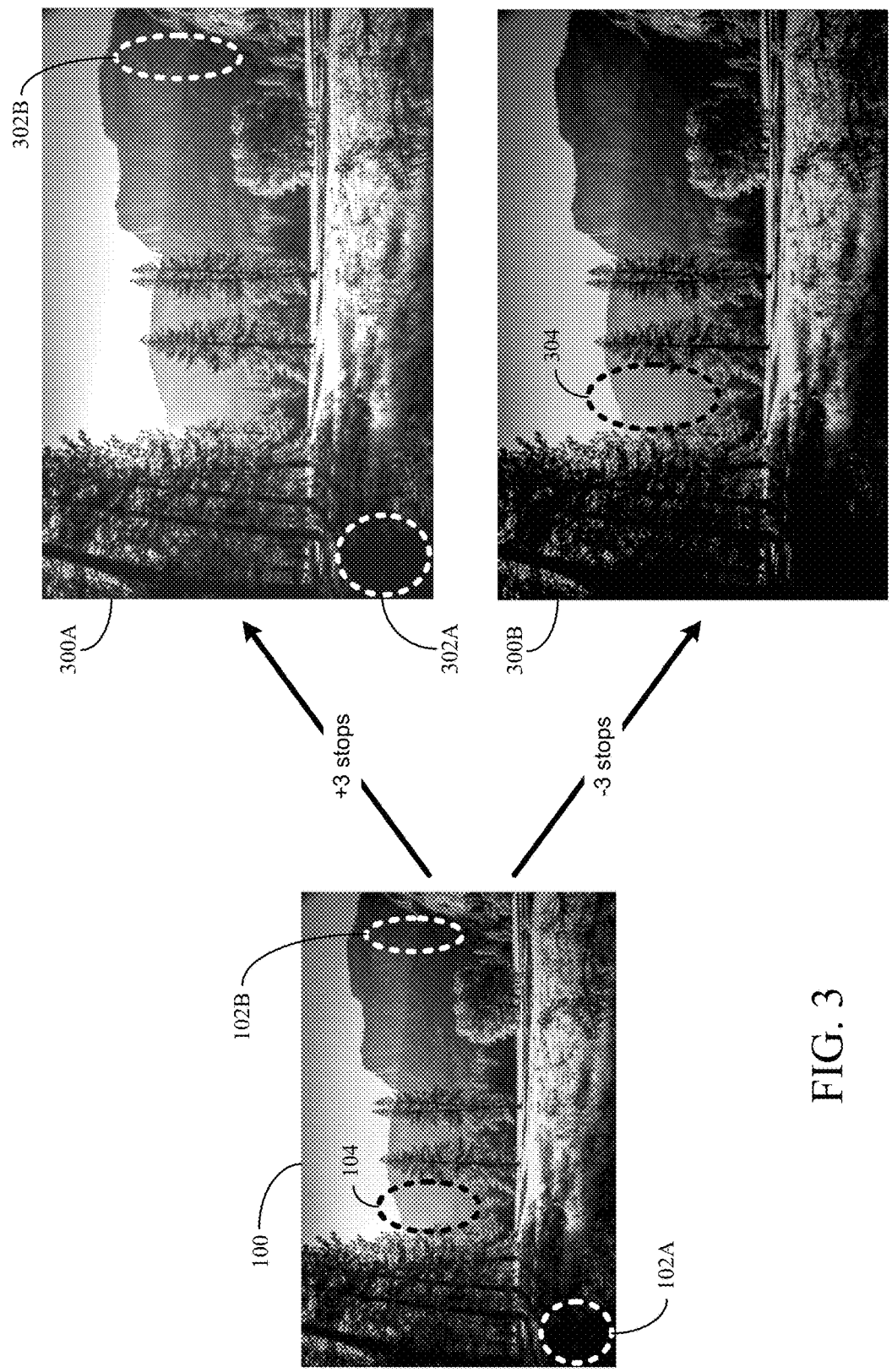
FIG. 3 illustrates an example overexposed image and an example underexposed image corresponding to the example LDR image in FIG. 1 for High-Dynamic Range (HDR) imaging.

In conventional HDR imaging, a device typically captures an overexposed image using a static number of stops greater than the stop used for capturing the LDR image, and then captures an underexposed image using the same static number of stops less than the stop used for capturing the LDR image. FIG. 3 illustrates an example overexposed image 300A and an example underexposed image 300B corresponding to the example LDR image 100 of FIG. 1. As shown in FIG. 3, the device captures the overexposed image 300A using an exposure value +3 stops greater than the stop used for capturing the LDR image 100, and captures the underexposed image 300B using an exposure value −3 stops less than the stop used for capturing the LDR image 100.

Because different brightness ranges are captured in the different images 100, 300A, and 300B, more detail may be captured for regions 102A, 102B, and 104 of the scene. For example, a darker region 302A in the overexposed image 300A may include more detail than the corresponding region 102A in the LDR image 100 by using a higher stop (which reduces black color saturation in the LDR image by allowing more light to be captured by the camera sensor). Similarly, a lighter region 304 in the underexposed image 300B may include more detail than the corresponding region 104 in the LDR image 100 by using a lower stop (which reduces white color saturation in the LDR image by allowing less light to be captured by the camera sensor). In this manner, the three LDR images 100, 300A, and 300B may be blended so that the resulting HDR image includes details from region 302A, region 302B, and region 304.

Figure 4:
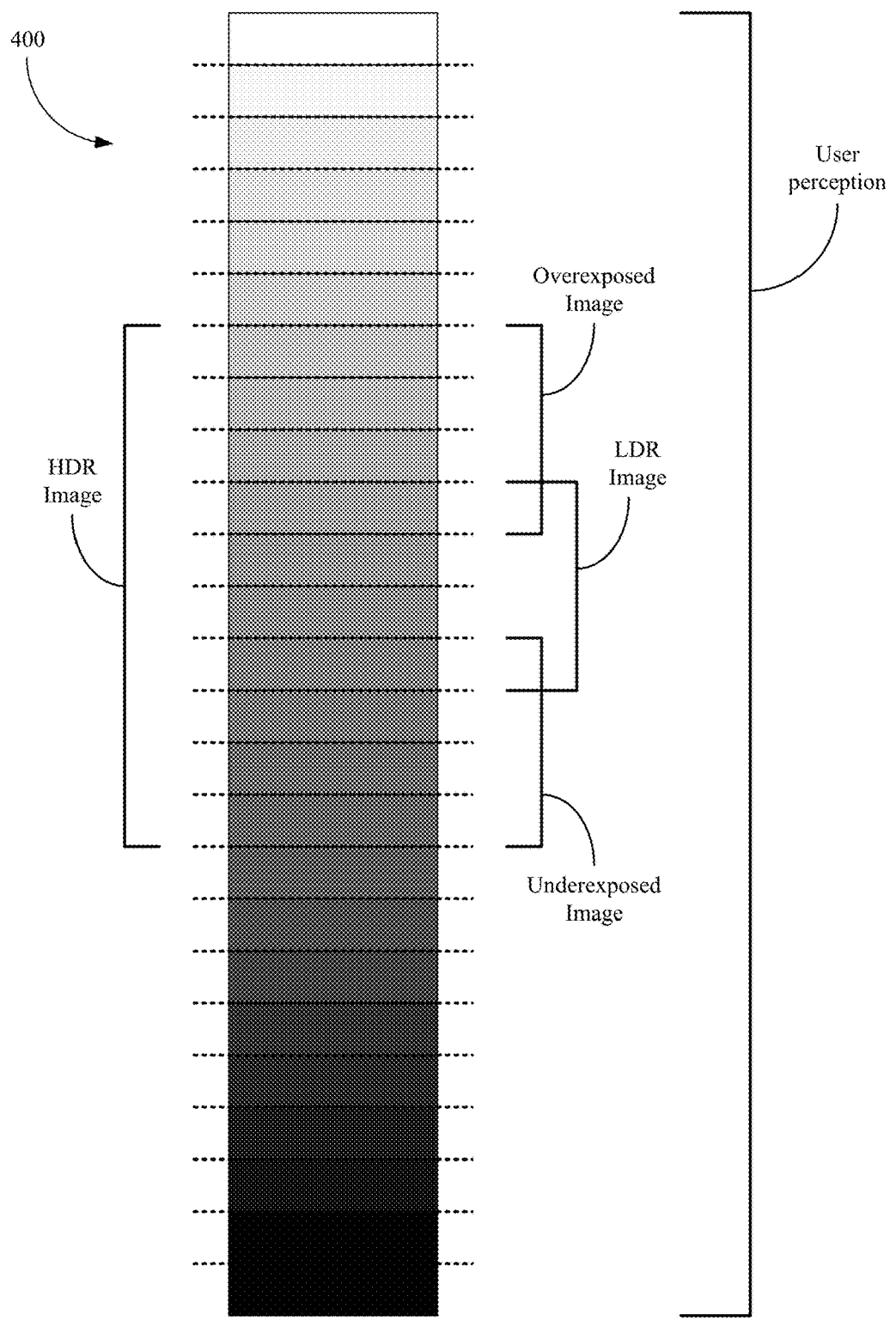
FIG. 4 illustrates an example brightness range for an HDR image corresponding to the LDR images in FIG. 3.

FIG. 4 illustrates an example brightness range 400 of the HDR image created from the LDR images 100, 300A, and 300B in FIG. 3. In the example of FIG. 4, if the conventionally determined exposure value (such as an AE setting) for a "normal" exposure image such as the LDR image 100 is considered to be stop 0, a device may capture an overexposed image at +3 stops (such as the overexposed LDR image 300A) and may capture an underexposed image at −3 stops (such as the underexposed LDR image 300B). After blending the three LDR images 100, 300A, and 300B together, if the brightness range captured for the LDR image 100 corresponds to [−2 stop, +2 stop], the brightness range captured for the underexposed LDR image 300B corresponds to [−5 stop, −1 stop], and the brightness range captured for the overexposed LDR image 300A corresponds to [+1 stop, +5 stop], then the brightness range for a resulting HDR image may correspond to [−5 stop, +5 stop]. Because the resulting HDR image has a greater range of brightness than a single LDR image, more detail may be perceived in the resulting HDR image than in the single LDR image. Capturing the images with a bracket of exposure values (such as [−3 stop, 0 stop, +3 stop] for the three images 100, 300A, and 300B) may be referred to herein as exposure bracketing. For conventional HDR imaging, the size of the bracket is static, and only the location of the bracket among exposure values changes.

One drawback of conventional HDR imaging is that the range of brightness of the resulting HDR image may not include all of the levels of brightness for a scene. For example, colors within one or more portions of the scene captured in the HDR image may be saturated (such as blacked out or whited out) if the brightness for the one or more portions of the scene are outside the range of brightness of the HDR image. In some aspects, a device may adjust the exposure value used for capturing the overexposed image or for the underexposed image to include those one or more portions of the scene. For example, the device may determine that a portion of the overexposed image is whited out, or may determine that a portion of the underexposed image is blacked out. The device may then recursively adjust the exposure value for the overexposed image or for the underexposed image and measure the colors for the portion until the colors of the portion are no longer saturated.

Recursively adjusting the exposure value for each LDR image increases the settling time before capturing an image, which increases the amount of time to capture the images and, therefore, may negatively affect the user experience. Another drawback of conventional HDR imaging is the need for both an underexposed image and an overexposed image. For some scenes, different underexposed images (such as for brightly lit scenes) or different overexposed images (such as for low lit scenes) may be more useful for creating an HDR image than one overexposed image and one underexposed image.

Aspects of the present disclosure describe systems and methods for automatically adjusting the exposure values to be used for HDR imaging. In some implementations, the adjustable exposure values are based on the scene and allow for a dynamic bracket of exposures. Further, the exposure values may be determined without using a recursive process that negatively affects the user experience. Additionally, the two additional exposure value images are not necessarily an underexposed image and an overexposed image, for example, as compared to the initial exposure value for the reference image. For example, the camera can determine an initial AE setting, and then determine if higher exposure values, lower exposure values, or a combination of higher and lower exposure values are to be used for capturing LDR image for other exposures.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as a security system with one or more cameras, smartphones, tablets, laptop computers, digital video and/or still cameras, web cameras, and so on) configured to or capable of capturing images or video. While described below with respect to a device having or coupled to one camera, aspects of the present disclosure are applicable to devices having any number of cameras, and are therefore not limited to devices having one camera. For example, different LDR images for HDR imaging may be captured by different camera sensors of a multiple camera module (such as a dual camera). Aspects of the present disclosure are applicable for capturing still images as well as for capturing video, and may be implemented in devices having or coupled to cameras of different capabilities (such as a video camera or a still image camera).

The term "device" is not limited to one or a specific number of physical objects (such as one smartphone, one camera controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects.

Figure 5:
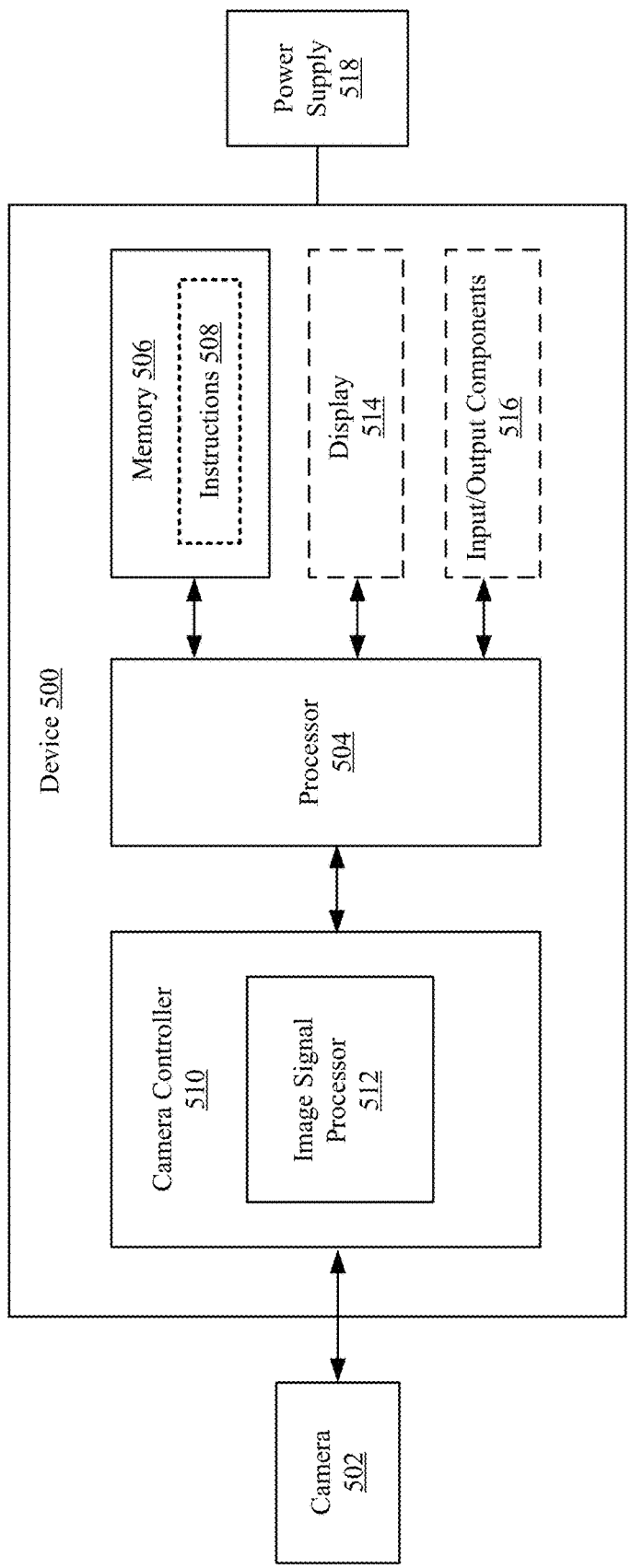
FIG. 5 is a block diagram of an example device for generating HDR images.

FIG. 5 is a block diagram of an example device 500 for generating HDR images. The example device 500 may include or be coupled to a camera 502, a processor 504, a memory 506 storing instructions 508, and a camera controller 510. The device 500 may optionally include (or be coupled to) a display 514 and a number of input/output (I/O) components 516. The device 500 may include additional features or components not shown. For example, a wireless interface, which may include a number of transceivers and a baseband processor, may be included for a wireless communication device. The device 500 may include or be coupled to additional cameras other than the camera 502. The disclosure should not be limited to any specific examples or illustrations, including the example device 500.

The camera 502 may be capable of capturing individual image frames (such as still images) and/or capturing video (such as a succession of captured image frames). The camera 502 may be a dual camera module or any other suitable module with multiple camera sensors, and one or more sensors may be used for HDR imaging. The memory 506 may be a non-transient or non-transitory computer readable medium storing computer-executable instructions 508 to perform all or a portion of one or more operations described in this disclosure. The device 500 may also include a power supply 518, which may be coupled to or integrated into the device 500.

The processor 504 may be one or more suitable processors capable of executing scripts or instructions of one or more software programs (such as instructions 508) stored within the memory 506. In some aspects, the processor 504 may be one or more general purpose processors that execute instructions 508 to cause the device 500 to perform any number of functions or operations. In additional or alternative aspects, the processor 504 may include integrated circuits or other hardware to perform functions or operations without the use of software. While shown to be coupled to each other via the processor 504 in the example of FIG. 5, the processor 504, the memory 506, the camera controller 510, the optional display 514, and the optional I/O components 516 may be coupled to one another in various arrangements. For example, the processor 504, the memory 506, the camera controller 510, the optional display 514, and/or the optional I/O components 516 may be coupled to each other via one or more local buses (not shown for simplicity).

The display 514 may be any suitable display or screen allowing for user interaction and/or to present items (such as captured images, video, or a preview image) for viewing by a user. In some aspects, the display 514 may be a touch-sensitive display. The I/O components 516 may be or include any suitable mechanism, interface, or device to receive input (such as commands) from the user and to provide output to the user. For example, the I/O components 516 may include (but are not limited to) a graphical user interface, keyboard, mouse, microphone and speakers, and so on. The display 514 and/or the I/O components 516 may provide a preview image to a user and/or receive a user input for adjusting one or more settings of camera 502.

The camera controller 510 may include an image signal processor 512, which may be one or more image signal processors to process captured image frames or video provided by the camera 502. In some example implementations, the camera controller 510 (such as the image signal processor 512) may also control operation of the camera 502. In some aspects, the image signal processor 512 may execute instructions from a memory (such as instructions 508 from the memory 506 or instructions stored in a separate memory coupled to the image signal processor 512) to process image frames or video captured by the camera 502. In other aspects, the image signal processor 512 may include specific hardware to process image frames or video captured by the camera 502. The image signal processor 512 may alternatively or additionally include a combination of specific hardware and the ability to execute software instructions.

Static exposure bracketing may not be sufficient for capturing some scenes with differences in brightness or light intensity. Additionally, after capturing an overexposed image or an underexposed image, recursively adjusting the exposure value for the image, measuring the brightness, and recapturing the image until the device settles on an exposure value may adversely impact the user experience by causing delay in capturing the image with the settled exposure value. For example, such delays may require a user to be still when positioning the camera for a longer amount of time to capture the images, and requiring the camera to be still for a longer amount of time may cause an increase in global motion (the user may fidget, shift, or move more) or may cause an increase in local motion (an object may enter the scene or objects in the scene may move to cause blur from blending multiple images). Further, using an overexposed image and an underexposed image to generate a reference image (with an AE setting) for HDR imaging may not be desirable for brightly lit or dark scenes.

Figure 6:
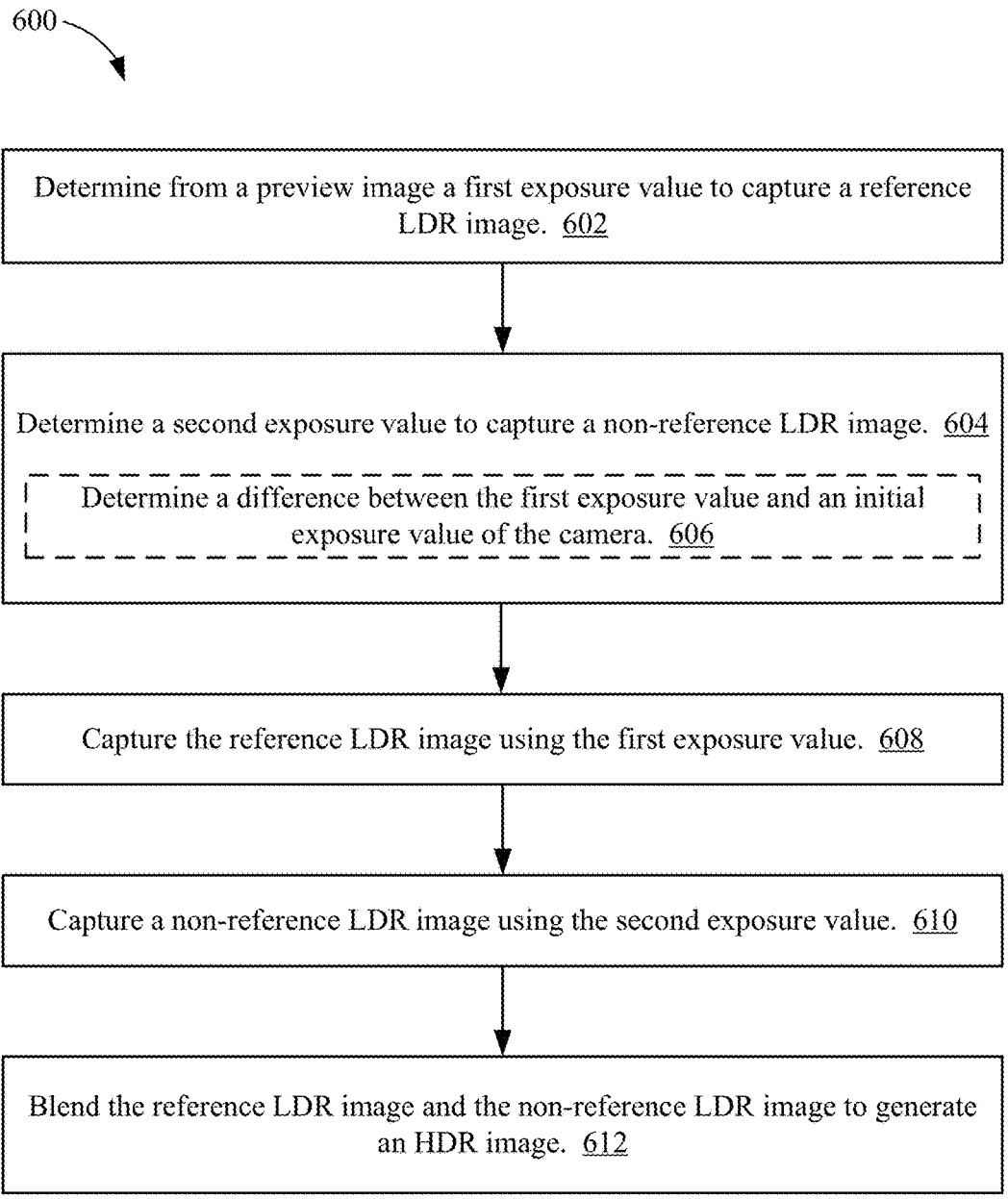
FIG. 6 is an illustrative flow chart depicting an example operation for dynamically determining an exposure value for HDR imaging.

FIG. 6 is an illustrative flow chart depicting an example operation 600 for dynamically determining an exposure value for HDR imaging. Although the example operation 600 is described below with respect to the device 500 of FIG. 5, the example operation 600 may be performed by other suitable devices or cameras. The device 500 may use an initial or default group of settings to activate a camera (such as activating the camera sensor). For example, an initial exposure value (such as an initial shutter speed, camera sensor sensitivity, and/or aperture size) and an initial white balance setting may be used in initializing the camera

502. When a camera sensor (such as for the camera 502) is initialized, the camera sensor captures information using the initial settings. The device 500 may use the captured information from the camera sensor to create a preview stream. For example, the camera controller 510 may receive the captured information from the camera 502 and generate a preview image to be used for adjusting the initial settings.

To generate a HDR image, the device 500 may determine, from the preview image, a first exposure value for capturing a reference LDR image (602). In some example implementations, the display 514 may present the preview image to a user, and the user may use the displayed preview image to manually set one or more capture settings, such as an exposure value. In some other example implementations, the device 500 may capture a LDR image with a target brightness. The device 500 may measure the brightness of an initial preview image (captured using the initial settings), and then may adjust one or more of the initial settings based on the difference between the target brightness and the measured brightness. For example, the device 500 may adjust the initial exposure value so that the measured brightness of the preview image converges to the target brightness. In some example implementations, the first exposure value may be the determined exposure value for which the target brightness equals the measured brightness of the preview image.

The device 500 also may determine a second exposure value for capturing a non-reference LDR image (604). For conventional HDR imaging, a device increases or decreases the first exposure value by a static amount configured for HDR imaging (such as 3 stops more than or less than the stop determined for capturing a reference LDR image). In contrast to conventional HDR imaging, the device 500 may determine a second exposure value that is not required to be a static number of stops more than or less than the exposure value for capturing the reference LDR image.

In some example implementations, instead of the second exposure value being a static number of stops away from the first exposure value, the second exposure value may be based on a difference between the initial exposure value and the first exposure value. For example, if the device 500 uses an AE setting to settle the measured brightness (such as matching a measured brightness of a preview image to the target brightness), the amount of difference between the initial exposure value and the first exposure value may correspond to the amount of difference between the first exposure value and the second exposure value. In determining a second exposure value, the device 500 may optionally determine a difference between the first exposure value and the initial exposure value (606).

Once the device 500 has determined the first exposure value for capturing the reference LDR image (602), the device 500 may capture the reference LDR image using the first exposure value (608). Similarly, once the device 500 has determined the second exposure value for capturing the reference LDR image (604), the device 500 may capture a non-reference LDR image using the second exposure value (610). After capturing the reference LDR image (608) and capturing a non-reference LDR image (610), the device 500 may blend the reference LDR image and the non-reference LDR image to generate an HDR image (612).

In some other example implementations, the device 500 may blend a plurality of non-reference LDR images to generate an HDR image. In some aspects, the device 500 may blend three or more LDR images (including two or more non-reference LDR images) to generate an HDR image.

In some example implementations, instead of always using an exposure value for an overexposed LDR image (having an exposure value greater than the exposure value for the reference LDR image) and using an exposure value for an underexposed LDR image (having an exposure value less than the exposure value for the reference LDR image), the device 500 may use two exposure values that are greater than the exposure value for the reference LDR image or may use two exposure values that are less than the exposure value for the reference LDR image. Additionally, or alternatively, the exposure values of the two non-reference LDR images may not correspond to each other. For example, if an exposure value for capturing a first non-reference LDR image is four stops from the exposure value for the reference LDR image, the exposure value for capturing a second non-reference LDR image is not necessarily four stops from the exposure value for the reference LDR image.

Figure 7:
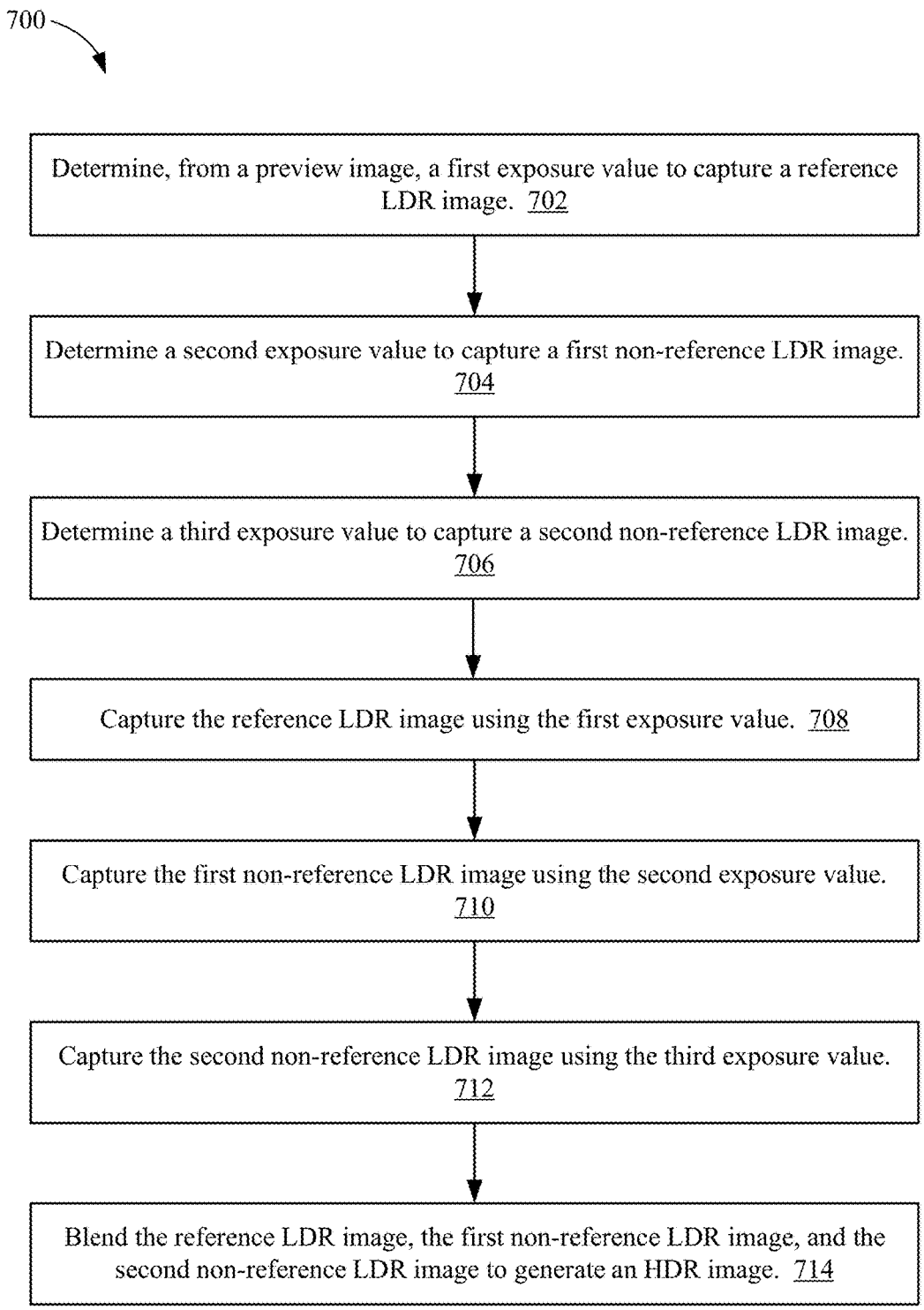
FIG. 7 is an illustrative flow chart depicting an example operation for dynamically determining multiple exposure values for HDR imaging.

FIG. 7 is an illustrative flow chart depicting an example operation 700 for dynamically determining multiple exposure values for HDR imaging. Although the example operation 700 is described below with respect to the device 500 of FIG. 5, the example operation 700 may be performed by other suitable devices or cameras. For example, the device 500 may determine an exposure value for capturing a first non-reference LDR image and may determine a different exposure value for capturing a second non-reference LDR image. The device 500 may determine a first exposure value for capturing a reference LDR image (702), and may determine a second exposure value for capturing a first non-reference LDR image (704). In some example implementations, the second exposure value may be based on a difference between the initial exposure value and the first exposure value. The device 500 may also determine a third exposure value for capturing a second non-reference LDR image (706). In some example implementations, the third exposure value may be based on a difference between the initial exposure value and the first exposure value. Additionally, the difference between the third exposure value and the first exposure value is not necessarily related to the difference between the second exposure value and the first exposure value. For example, if the difference between a first exposure value and a second exposure value is six stops, the difference between the first exposure value and a third exposure value is not necessarily six stops.

After determining the first exposure value, the device 500 may capture the reference LDR image using the first exposure value (708). The device 500 also may capture the first non-reference LDR image using the determined second exposure value (710). The device 500 may also capture a second non-reference LDR image using the determined third exposure value (712). After capturing the three LDR images, the device 500 may blend the reference LDR image, the first non-reference LDR image, and the second non-reference LDR image to generate an HDR image (714).

A difference in brightness between images may correlate to a difference in exposure values for capturing the images. For example, a darker image may correspond to a faster shutter speed, smaller aperture size, and/or reduced camera sensor sensitivity. In some example implementations, a difference in brightness linearly correlates to the difference in exposure values. In some aspects, if a target brightness is used in adjusting an exposure value before capturing an image, a linear correlation between a difference in a measured brightness and the target brightness and a difference in the corresponding initial exposure value (for an initial measured brightness) and adjusted exposure value (for the measured brightness equaling the target brightness) may be expressed in equation (1) below:

$$\frac{|\text{Adjusted Exposure Value} - \text{Initial Exposure Value}|}{|\text{Target Brightness} - \text{Initial Measured Brightness}|} = X \quad (1)$$

where X is a real number. When a linear correlation exists, a difference in exposure values for capturing any two images divided by the difference in corresponding brightness for the two images may equal X. Thus, expanding equation (1) to differences in exposure value in general may be expressed in equation (2) below:

$$\frac{|\text{Exposure Value 1} - \text{Exposure Value 2}|}{|\text{Brightness}(\text{Exposure Value 1}) - \text{Brightness}(\text{Exposure Value 2})|} = X \quad (2)$$

where X is a real number, Exposure Value 1 is a first exposure value, Exposure Value 2 is a second exposure value, Brightness(Exposure Value 1) is a brightness corresponding to an image for a first exposure value, and Brightness(Exposure Value 2) is a brightness corresponding to an image for a second exposure value. For example, Exposure Value 1 may be an initial exposure value for and Brightness (Exposure Value 1) may be the corresponding measured brightness of an initial preview image. Exposure Value 2 may be an adjusted exposure value for and Brightness (Exposure Value 2) may be the corresponding measured brightness of the settled preview image.

When determining an exposure value for capturing an LDR image, some devices set a default or initial exposure value, generate a preview image using the set exposure value, measure the brightness of the preview image, compare the measured brightness to a target brightness, and determine if the set exposure value should be adjusted. To settle adjusting the exposure value, the preview image is recursively updated, with the brightness of the preview image measured and compared to the target brightness and the exposure value adjusted, until the measured brightness equals the target brightness for a preview image for a settled exposure value.

The device 500 may determine the exposure values for capturing LDR images without using a recursive process of adjusting exposure values. In some example implementations, if there is a correlation between a difference in exposure values and a difference in brightness corresponding to the exposure values (such as a linear correlation expressed in equation (1) or equation (2) above), the device 500 may use the correlation to determine an exposure value for a non-reference LDR image. For example, equation (2) can be reordered as expressed in equation (3) below:

Exposure Value 2=Exposure Value 1+X*(Brightness (Exposure Value 2)−Brightness(Exposure Value 1)) (3)

In this manner, if Exposure Value 1, Brightness(Exposure Value 1), Brightness(Exposure Value 2), and linear correlation value X is known, Exposure Value 2 may be determined without using a recursive process of adjusting the exposure value and measuring and comparing the brightness of a preview image.

In some example implementations, the correlation value X may be stored by the device for future use. In one example, a manufacturer may determine the correlation and store the correlation within a memory of the device during device production. The device may then use the stored correlation to determine one or more exposure values for HDR imaging. The stored correlation may be static (such as never changing during the life of the device), or the stored correlation may be dynamic. For example, as a device is used over time, the shutter speed may decrease, the camera sensor may become less sensitive, a film may develop over a camera lens (affecting the amount of light captured), and so on. A device may analyze captured images to determine if the correlation changes over time. If the device identifies that the correlation has changed (such as determining over the last plurality of images that the correlation is different), the device may update the stored correlation for future use in HDR imaging.

Figure 8:
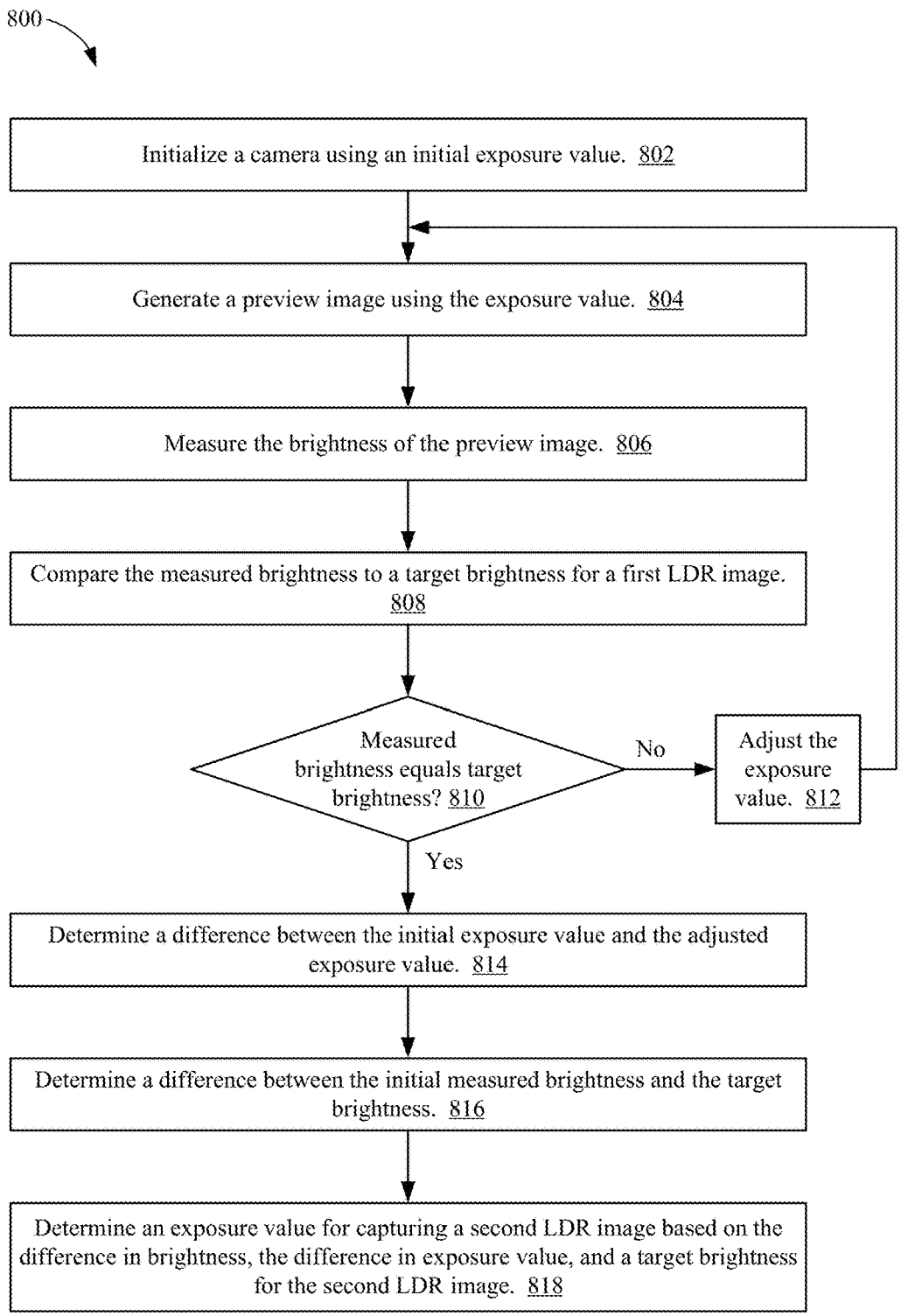
FIG. 8 is an illustrative flow chart depicting an example operation for determining an exposure value based on a difference between exposure values and a difference between brightness values corresponding to the exposure values.

FIG. 8 is an illustrative flow chart depicting an example operation 800 for determining an exposure value based on a difference between exposure values and a difference between brightness corresponding to the exposure values. Although the example operation 800 is described below with respect to the device 500 of FIG. 5, the example operation 800 may be performed by other suitable devices or cameras. The device 500 may initialize the camera 502 using an initial exposure value (802). For example, the device 500 may provide power to the camera 502 and configure the camera 502 using an initial camera sensor sensitivity, shutter speed, and aperture size for the camera to begin capturing information. The device 500 may then use the captured information from the initialized camera 502 to generate a preview image (804).

The device 500 may include a target brightness for an LDR image to be captured. In this manner, the device 500 may use the preview image to determine if the exposure value is to be adjusted before capturing a first LDR image. In some example implementations, the device 500 may measure the brightness of the preview image (806). The device 500 may then compare the measured brightness to a target brightness for a first LDR image (808). If the measured brightness does not equal the target brightness (810), then the device 500 may adjust the exposure value (812) and generate another preview image using the exposure value (804). For example, if the measured brightness is greater than the target brightness, the device 500 may make the camera 502 aperture size smaller, may decrease the sensor sensitivity, and/or may increase the camera shutter speed to decrease the exposure value.

In some aspects, the exposure value for capturing a first LDR image may be determined when the measured brightness equals the target brightness, and the device 500 may determine an exposure value for capturing a second LDR image. Once the measured brightness equals the target brightness (810), the device 500 may determine a difference between the initial exposure value (used in initializing the camera 502) and the adjusted exposure value for which the measured brightness equals the target brightness (814). The device 500 may also determine a difference between the initial measured brightness and the target brightness (816).

The device 500 may then use a target brightness for the second LDR image, the difference between the exposure values, and the difference between the brightness to determine an exposure value for capturing the second LDR image (818). In some example implementations, the difference in brightness and the difference in exposure value may be linearly correlated. In this manner, and referring to equation (1), a linear correlation value X may be the difference in brightness divided by the difference in exposure value. Referring to equation (3), the device 500 may determine an exposure value corresponding to a target brightness for the second LDR image, which may be expressed by equation (4) below:

$$EV(\text{LDR image 2}) = EV(\text{LDR image 1}) + X*(\text{Target Brightness}(\text{LDR image 2}) - \text{Measured Brightness}(\text{LDR image 2})) \quad (4)$$

where EV (LDR image 2) is the exposure value for capturing the second LDR image, EV (LDR image 1) is the exposure value for capturing the first LDR image, X is the linear correlation value, Measured Brightness(LDR image 2) is the measured brightness for the second LDR image, and Target Brightness(LDR image 2) is the target brightness for the second LDR image. If the entire preview image is used in determining measured brightness, the measured brightness for the second LDR image may be the same as the target brightness for the first LDR image. The brightness may be different, for example, if different portions or groupings of the preview image are used in determining brightness.

The steps of the example operation 800 may be performed in a different order, some steps may be performed concurrently or sequentially, other steps not illustrated may be performed, and/or some illustrated steps may not be performed. In one example, a difference in brightness may be determined when first comparing the measured brightness to the target brightness for a first LDR image (808). In another example, the difference in brightness and the difference in exposure values may be determined concurrently or in a different order. In a further example, if the device 500 uses a look-up table based on a linear correlation value X, the device 500 may not determine the difference in exposure value and the difference in brightness, and instead may use the target brightness for the second LDR image, the measured brightness for the second LDR image, and the target brightness for the second LDR image as references to determine from the look-up table an exposure value for capturing the second LDR image. In another example of a look-up table, the device 500 may use the initial exposure value, the exposure value for capturing the first LDR image, and the target brightness for capturing the second LDR image as references to determine from the look-up table an exposure value for capturing the second LDR image.

In some aspects, determining the exposure value for capturing a second LDR image may be a one-shot operation without requiring recursion or multiple adjustments. In the examples of algorithmically determining the exposure value for capturing a second LDR image and in the examples of using a look-up table to determine the exposure value for capturing a second LDR image, the device 500 may not require a recursive adjustment to the exposure value or a comparison between a measured brightness and a target brightness. If more than two LDR images are to be captured for HDR imaging (such as three images), the device 500 may use the example operation 800 or the look-up table to determine the exposure values for capturing the other LDR images.

In conventional HDR imaging, after a device determines the exposure value for capturing a reference LDR image, the device typically uses a static difference to determine the exposure values for capturing the underexposed LDR image and for capturing the overexposed LDR image. For example, if the exposure value for capturing the reference LDR image is stop or f-value 0, the device may use a static difference of 6 stops to determine the exposure value for capturing an underexposed LDR image (such as stop or f-value −6) and to determine the exposure value capturing an overexposed LDR image (such as stop or f-value+6). If a static difference is used, adjusting the exposure values for the non-reference HDR images may employ a recursive process of adjusting the exposure value and measuring the brightness for a preview image. Further, if a static difference in exposure value is used, the additional exposure LDR images may be required to include an overexposed LDR image and an underexposed LDR image (such as instead of two higher exposure LDR images or two lower exposure LDR images).

In some example implementations, the device 500 may determine a target brightness for a first non-reference LDR image, and may determine a different target brightness for a second non-reference LDR image. In this manner, the device 500 may be configured to capture multiple higher exposure LDR images, to capture multiple lower exposure LDR images, and/or to determine the differences in exposure values to be non-static (such as a different number of stops between exposure values).

Different portions of a scene may include different light intensities. Referring again to the scene in the LDR image 100 of FIG. 1, the portions of the scene corresponding to regions 102A and 102B may have lower light intensities than the average light intensity of the entire scene. Conversely, the portion of the scene corresponding to region 104 may have higher light intensities than the average light intensity of the entire scene. The device 500 may use a portion of a preview image to determine a target brightness for an LDR image. In this manner, different portions of the preview image may be used to determine the target brightness for different LDR images. For example, a first portion of a preview image may be used to determine a target brightness for a first LDR image, and a second portion of a preview image may be used to determine a target brightness for a second LDR image.

Each pixel of a preview image includes a measured brightness in a range of brightness. For example, each pixel brightness may be an eight-bit value indicating the luma or luminance on a scale from 0 to 255. In some example implementations, the device 500 may group pixels with similar brightness into separate groupings, and may use the separate groupings to determine a target brightness for each grouping. For example, if three LDR images are to be captured for HDR imaging, the device 500 may divide the pixels of a preview image into three groupings of different brightness ranges. In some example implementations, all of the pixels are divided into groupings. In some other example implementations, only a subset of the pixels is divided into groupings (with the remainder not placed into groupings). Additionally, or alternatively, the pixels in a grouping may be contiguous or spatially separate. While pixels are described in the examples provided in this disclosure, other example spatial units of a preview image suitable for use may include macroblocks, blocks of pixels, bounded areas (such as areas defined by edges in the preview image), and so on.

In some example implementations, the preview image used for dividing the pixels into groupings is the preview image captured using the adjusted exposure value for which the measured brightness equals the target brightness for a reference LDR image. For example, the target brightness for a reference LDR image may be predetermined, and the measured brightness may be the average or median pixel brightness value for the preview image. In this manner, the exposure value for the reference LDR image may be dependent on the brightness of all of the pixels of a preview image. In some other implementations, the exposure value for the reference LDR image may be dependent on the brightness of only a portion of the pixels. For example, the device 500 may only use a center portion of the preview image, may use the pixels in a middle range of brightness compared to the range of brightness in an initial preview image, and so on. Once the exposure values for the reference LDR image are determined, the device 500 may divide the pixels of the preview image into groupings and determine the target brightness for the non-reference LDR images based on the groupings.

When the exposure value changes, the change in brightness should be similar across the pixels of a preview image. In some example implementations, the device 500 may use the initial preview image generated using the initial settings (such as an initial exposure value) to divide the pixels into multiple groupings based on brightness, with the groupings having non-overlapping ranges of brightness. In one example, the device 500 may divide the pixels evenly into groupings so that the groupings are the same size (and the groupings may have different size ranges in brightness). In another example, the device 500 may divide the pixels into groupings with the same size range of brightness (and the groupings may include a different number of pixels).

Figure 9B:
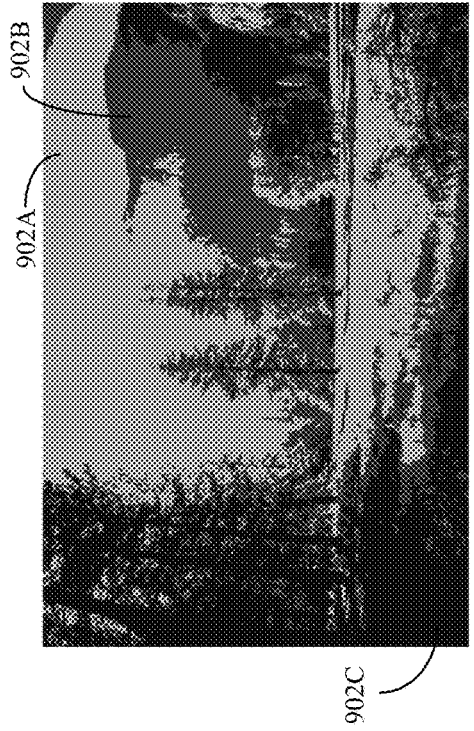
FIG. 9B illustrates example groupings corresponding to the initial preview image in FIG. 9A.
Figure 9C:
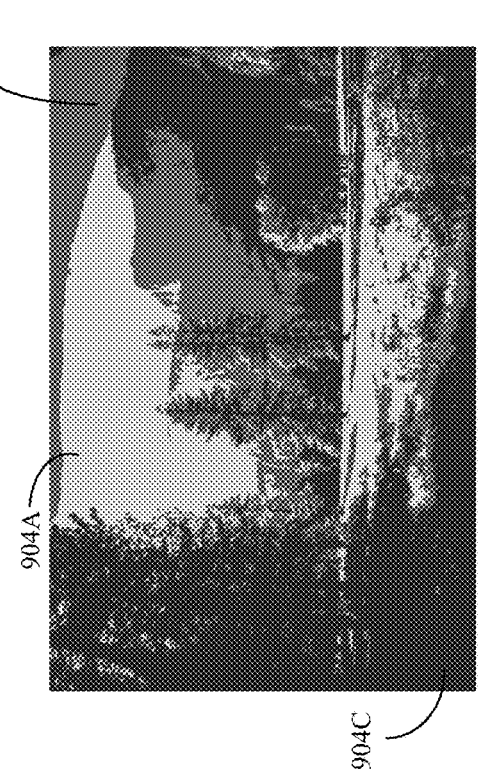
FIG. 9C illustrates another example groupings corresponding to the initial preview image in FIG. 9A.
Figure 9A:
FIG. 9A illustrates an example initial preview image.

FIG. 9A illustrates an example initial preview image 900. The initial preview image 900 corresponds to the example LDR image 100 in FIG. 1. If the initial preview image 900 is to be divided into three groupings with the same size range of brightness, the number of pixels may differ between groupings. For example, FIG. 9B illustrates example groupings 902A, 902B, and 902C corresponding to the initial preview image 900 in FIG. 9A. The example groupings 902A, 902B, and 902C have the same range of brightness that are non-overlapping. For the example of FIG. 9B, the grouping 902B has less pixels than the grouping 902A.

If the initial preview image 900 is to be divided into three groupings of the same size, the number of pixels in the first group may approximately equal the number of pixels in the second group, and may approximately equal the number of pixels in the third group. For example, FIG. 9C illustrates example groupings 904A, 904B, and 904C of approximately the same size that correspond to the initial preview image 900 in FIG. 9A. The grouping 904A is approximately the same size as the grouping 904B. Referring also to FIG. 9B, the grouping 904A of FIG. 9C is smaller than the grouping 902A of FIG. 9B, for example, because some of the pixels in the grouping 902A of FIG. 9B are included in the grouping 904B instead of the grouping 904A of FIG. 9C.

In some example implementations, the device 500 may use one or more brightness thresholds to determine into which grouping a pixel is to be placed. In some aspects, the device 500 may determine an N−1 number of thresholds for a preview image to be divided into N number of groupings. For example, if a preview image is to be divided into three groupings (such as the preview image 900 in FIG. 9A being divided into three groupings 902A, 902B, and 902C in FIG. 9B or into three groupings 904A, 904B, and 904C in FIG. 9C), the device 500 may determine two brightness thresholds.

Figure 10:
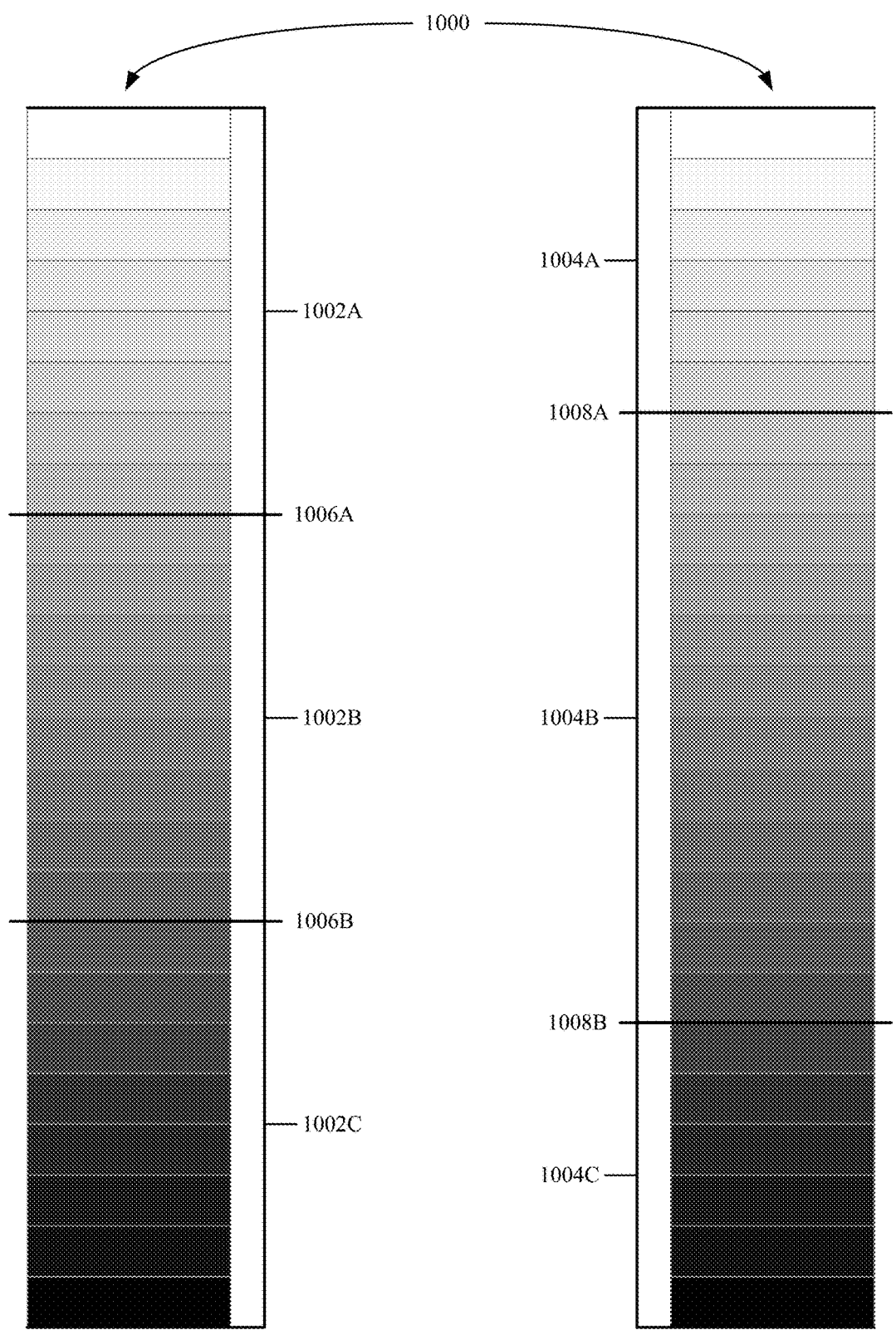
FIG. 10 illustrates an overall brightness range for the preview image in FIG. 9A.

FIG. 10 illustrates an overall brightness range 1000 for the preview image 900 in FIG. 9A. The overall brightness range 1000 on the left is divided into a first brightness range 1002A, a second brightness range 1002B, and a third brightness range 1002C. Brightness ranges 1002A, 1002B, and 1002C correspond to groupings 902A, 902B, and 902C in FIG. 9B, respectively. The first brightness range 1002A is the same size as the second brightness range 1002B, and is the same size as the third brightness range 1002C. The first brightness range 1002A and the second brightness range 1002B are divided by a threshold 1006A. The second brightness range 1002B and the third brightness range 1002C are divided by a threshold 1006B. As shown, the thresholds 1006A and 1006B are equidistant from each other and the top or bottom, respectively, of the overall brightness range 1000.

The overall brightness range 1000 on the right is divided into brightness a first range 1004A, a second brightness range 1004B, and a third brightness range 1004C. Brightness ranges 1004A, 1004B, and 1004C correspond to groupings 904A, 904B, and 904C in FIG. 9C, respectively. The first brightness range 1004A and the second brightness range 1004B are divided by a threshold 1008A. The second brightness range 1004B and the third brightness range 1004C are divided by a threshold 1008B. Since the size of the groupings 904A, 904B, and 904C are approximately the same, the brightness ranges 1004A, 1004B, and 1004C may be of different sizes. For example, some of the pixels of the preview image 900 in FIG. 9A in the grouping 902A in FIG. 9B are in the grouping 904B in FIG. 9C. In this manner, the size of the brightness range 1004A is smaller than the size of the brightness range 1002A.

Figure 11:
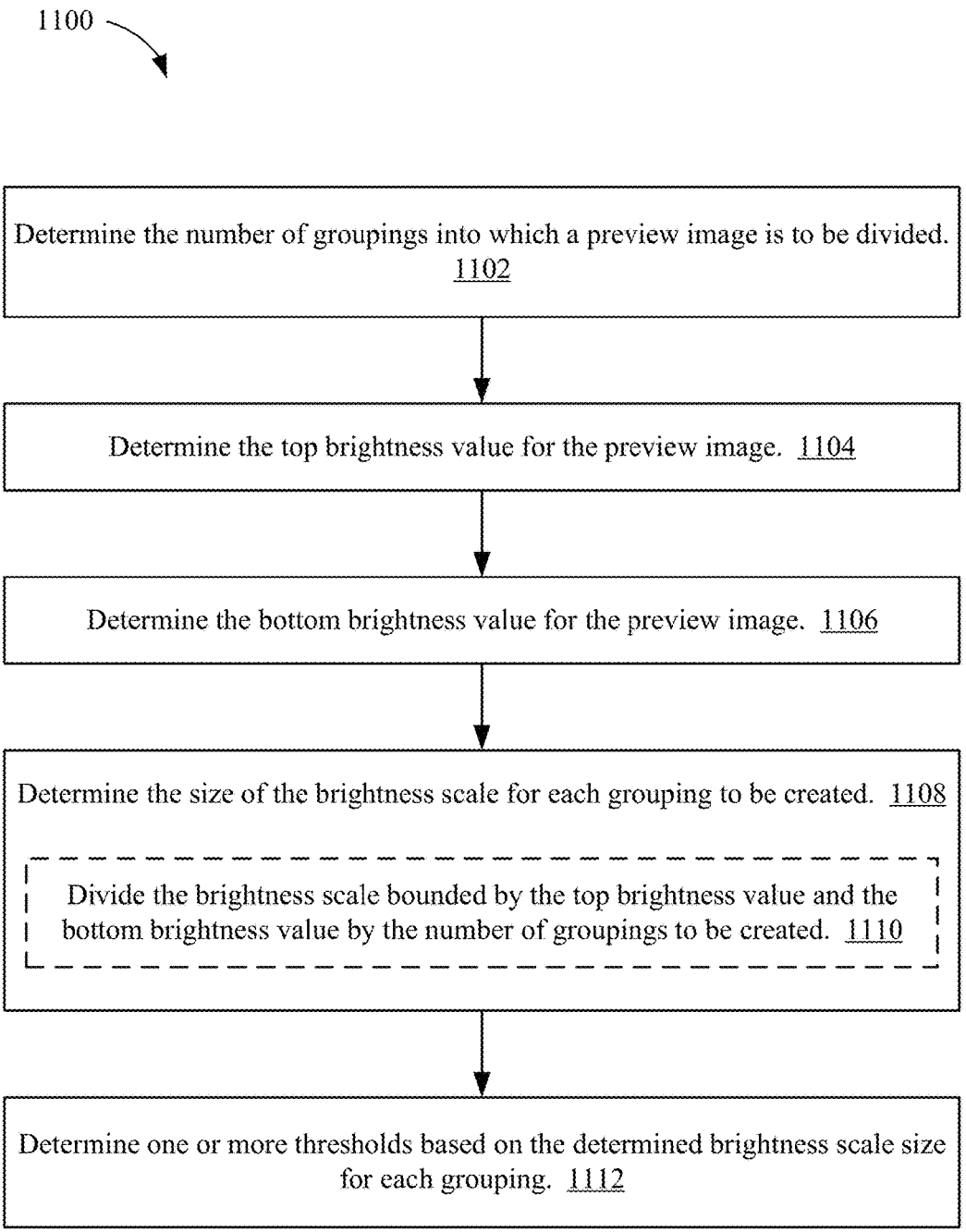
FIG. 11 is an illustrative flow chart depicting an example operation for determining one or more thresholds for groupings with brightness ranges of the same size.

In some example implementations, the device 500 may determine one or more thresholds to create the groupings for a preview image. FIG. 11 is an illustrative flow chart depicting an example operation 1100 for determining one or more thresholds for groupings with brightness ranges of the same size. Although the example operation 1100 is described below with respect to the device 500 of FIG. 5, the example operation 1100 may be performed by other suitable devices or cameras. The device 500 may first determine the number of groupings into which a preview image is to be divided (1102). In one example, the number of groupings equals the number of LDR images to be captured for an HDR image.

The device 500 may also determine the top brightness value for a preview image (1104), and may determine the bottom brightness value for the preview image (1106). In some example implementations, the top brightness value may be the highest brightness value of any pixel in the preview image, and the bottom brightness value may be the lowest brightness value for any pixel in the preview image. For example, for an overall brightness scale of 0 to 255, if the highest brightness value is 240 (no other pixel has a brightness value greater than 240), the top brightness value may be determined to be 240. If a pixel with the lowest brightness value is 20 (no other pixel has a brightness value less than 20), the bottom brightness value may be determined to be 20.

In some other example implementations, the top brightness value may be the top of the overall brightness scale, regardless of whether any of the pixels have a brightness value equaling the top of the overall brightness scale. For example, if the highest brightness value is 240 on an overall brightness scale of 0 to 255, the top brightness value may be determined to be 255. Similarly, the bottom brightness value may be the bottom of the overall brightness scale, regardless of whether any of the pixels have a brightness value equaling the bottom of the overall brightness scale. For example, if the lowest brightness value is 20 on an overall brightness scale of 0 to 255, the bottom brightness value may be determined to be 0.

In some further example implementations, the device 500 may disregard some pixel brightness values when determining the top brightness value and/or when determining the bottom brightness value. In one example, the device 500 may determine a mean or median brightness value, and only review pixels with a brightness value within a number of standard deviations from the mean or median. In another example, the device 500 may determine any outlier pixels in brightness and remove them before determining the top brightness value and/or the bottom brightness value.

After determining the top and bottom brightness values, the device 500 may determine the size of the brightness scale for each grouping to be created (1108). For example, the device 500 may divide the brightness scale bounded by the top brightness value and the bottom brightness value by the number of groupings to be created (1110). The device 500 may then determine the one or more thresholds based on the determined brightness scale size for each grouping (1112). For example, for three groupings to be created (such as groupings 902A, 902B, and 902C in FIG. 9B and groupings 904A, 904B, and 904C in FIG. 9C), the threshold dividing the brightness scale for a first grouping and the brightness scale for a second grouping (such as threshold 1006A dividing brightness scales 1002A and 1002B in FIG. 10) may be the top brightness value minus the determined brightness scale size. Similarly, the threshold dividing the brightness scale for the second grouping and the brightness scale for a third grouping (such as threshold 1006B dividing brightness scales 1004A and 1004B in FIG. 10) may be the bottom brightness value plus the determined brightness scale size.

Figure 12:
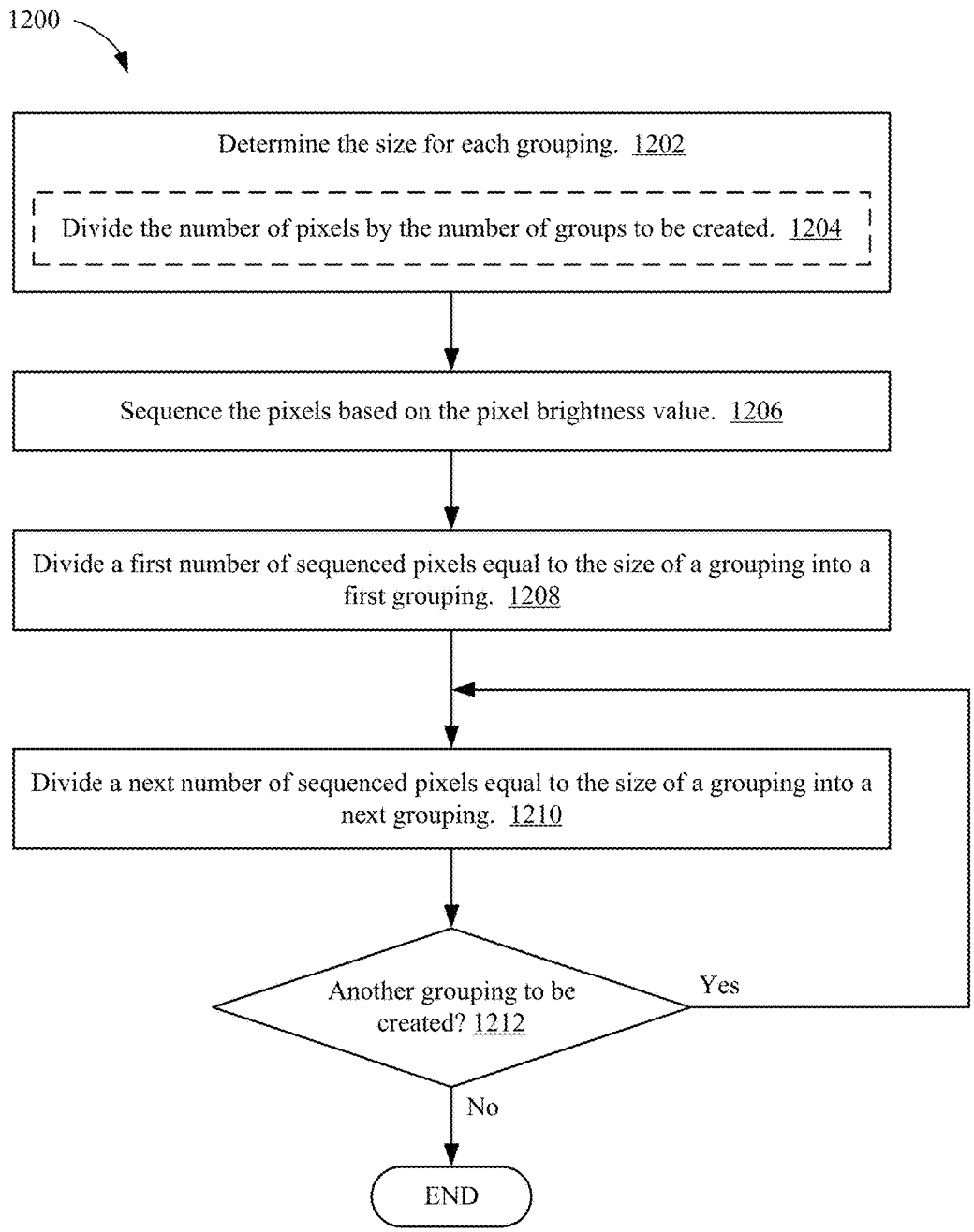
FIG. 12 is an illustrative flow chart depicting an example operation for creating groupings of the same size.

In one alternative to the brightness scales of the groupings being the same size, the groupings themselves may be the same size (such as approximately the same number of pixels). FIG. 12 is an illustrative flow chart depicting an example operation 1200 for creating groupings of the same size. Although the example operation 1200 is described below with respect to the device 500 of FIG. 5, the example operation 1200 may be performed by other suitable devices or cameras. Groupings of the same size may be groupings with approximately the same number of pixels. In some example implementations, the device 500 may determine the size for each grouping (1202). For example, the device 500 may divide the number of pixels by the number of groupings to be created (1204). In some other example implementations, if all preview images are the same size and the same number of groupings are to be created, the device 500 may use a pre-determined number of pixels based on the preview image size and the number of groupings.

The device 500 may also sequence the pixels based on the pixel brightness value (1206). The device 500 may divide a first number of sequenced pixels (with the number equal to the determined size of a grouping) into a first grouping (1208), and then divide a next number of sequence pixels (also with the number equal to the determined size of a grouping) into a second grouping (1210). If another grouping is to be created (1212), the device 500 may divide the next number of sequenced pixels into a next grouping (1210). When no other grouping is to be created (1212), all groupings have been created and the example operation 1200 ends. In some example implementations, the device 500 may determine one or more pixels that are outliers in brightness value (such as pixels that are noise or static in the preview image). For example, when sequencing the pixels, the device 500 may identify that one or more pixels are separated by a threshold amount of brightness from other pixels in the preview image. The device 500 may thus determine to remove the pixels when determining the size of the groupings and when creating the groupings.

The groupings for a preview image may then be used to determine one or more exposure values for LDR images to be captured. For example, one of the groupings may be used for determining an exposure value for a reference LDR image and the remaining groupings may be used for determining exposure values for one or more non-reference LDR images. In contrast to conventional HDR imaging that requires the reference LDR image's exposure value to be between the exposure value for an underexposed LDR image and the exposure value for an overexposed LDR image, the device 500 may determine that the exposure value for a reference LDR image is greater than the exposure values for the non-reference LDR images, or the device 500 may determine that the exposure value for a reference LDR image is less than the exposure values for the non-reference LDR images.

In some example implementations, the device 500 determines which grouping of a preview image corresponds to a reference LDR image to be captured. The grouping of pixels may then be used to determine an exposure value for capturing the reference LDR image. In one example, the determination may be based on a region of interest (ROI). The region of interest may be based on a user input (such as the user touching a portion of a touch sensitive display 514), may be based on an automatically identified region of the preview image (such as the device 500 identifying a face through facial recognition), may be based on a location in the preview image (such as a center portion of the preview image) and/or may be based on other factors. In one example using a region of interest, if the user touches a portion of the display 514 to indicate a region of interest, the device 500 may determine which grouping of pixels includes the region of interest. In another example of using a region of interest, if a face is identified in the preview image, the device 500 may determine which grouping of pixels includes the identified face. In a further example of using a region of interest, the device 500 may determine which of the groupings includes the most of the center portion of the preview image. In some other example implementations, if the sizes of the groupings are different for a preview image, the largest size grouping may be used to determine an exposure value for capturing the reference LDR image. In some further example implementations, if the sizes of the brightness ranges are different for the groupings of a preview image, the grouping with the largest size brightness range may be used to determine an exposure value for capturing the reference LDR image. The device 500 may then identify the determined grouping as the grouping to be used in determining an exposure value for a reference LDR image.

Referring again to the example operation 800 in FIG. 8, if a grouping of pixels from an initial preview image is to be used in determining the exposure value for the reference LDR image, the device 500 may measure the brightness of the preview image (806) by measuring the brightness of the grouping of pixels. For example, the device 500 may determine a mean brightness or median brightness for the grouping of pixels. In this manner, the grouping of pixels may be used in adjusting the exposure value so that the measured brightness of the grouping of pixels equals the target brightness for the reference LDR image.

After adjusting the exposure value so that the measure brightness of the grouping of pixels equals the target brightness (810), the brightness of the one or more groupings to be used in determining the exposure values for capturing the non-reference LDR images may be determined from the preview image generated using the adjusted exposure value (such as the last generated preview image where the measured brightness equals the target brightness). In this manner, the other groupings of pixels are used in determining the measured brightness, which is used to determine the exposure values for capturing the non-reference LDR images (such as through a look-up table or algorithmically through equation (4) above). Since any grouping may be associated with determining the exposure value for a reference LDR image, the reference LDR image may have a higher exposure value than the non-reference LDR images, a lower exposure value than the non-reference LDR images, or an exposure value anywhere between the exposure values of the non-reference LDR images.

Once the exposure values are determined for the multiple LDR images to be captured, the device 500 may capture the LDR images using the determined exposure values. Any technique may then be used by device 500 to blend the LDR images into an HDR image. In one example, the regions of the LDR images associated with the respective groupings of pixels from the preview image may be stitched together from the multiple LDR images. In another example, the entire reference LDR image may be used, and the regions of the non-reference LDR images associated with the respective groupings of the preview image may be used to brighten or darken portions of the reference LDR image.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 206 in the example device 500 of FIG. 5) comprising instructions 508 that, when executed by the processor 504 (or the image signal processor 512), cause the device 500 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 504 or the image signal processor 512 in the example device 500 of FIG. 5. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the example operations illustrated in FIGS. 6-8 and 11-12, if performed by the device 500, the camera controller 510, the processor 504, and/or the image signal processor 512, may be performed in any order and at any frequency (such as for every HDR image or when requested by a user (such as placing the device 500 in a special HDR imaging mode)). Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device configured to generate a High-Dynamic Range (HDR) image, comprising:
   one or more processors; and
   a memory coupled to the one or more processors and including instructions that, when executed by the one or more processors, cause the device to:
   divide a preview image captured with an initial exposure value by a camera into at least a first grouping, a second grouping, and a third grouping;
   measure a first initial brightness of the first grouping;
   measure a second initial brightness of the second grouping;
   measure a third initial brightness of the third grouping;
   determine a first exposure value for capturing a reference image, wherein the first exposure value is based on the first initial brightness and a first target brightness for the reference image;
   determine a second exposure value for capturing a first non-reference image, wherein the second exposure value is based on the second initial brightness and a second target brightness for the first non-reference image;
   determine a third exposure value for capturing a second non-reference image, wherein the third exposure value is based on the third initial brightness and a third target brightness for the second non-reference image;
   capture the reference image using the first exposure value;
   capture the first non-reference image using the second exposure value;
   capture the second non-reference image using the third exposure value; and
   blend the reference image, the first non-reference image, and the second non-reference image to generate an HDR image.

2. The device of claim 1, wherein:
   the first exposure value is greater than the second exposure value and greater than the third exposure value; or the first exposure value is less than the second exposure value and less than the third exposure value.

3. The device of claim 1, wherein execution of the instructions for dividing the preview image causes the device to:
- determine a first threshold and a second threshold of a brightness scale for the preview image, wherein the first threshold and the second threshold divide the brightness scale into a first brightness range associated with the reference image, a second brightness range associated with the first non-reference image, and a third brightness range associated with the second non-reference image;
- compare brightness for portions of the preview image with the first threshold and the second threshold;
- separate the portions of the preview image into the first grouping, the second grouping, and the third grouping based on the comparison.

4. The device of claim 1, wherein execution of the instructions further causes the device to determine a correlation between a change in exposure value of the preview image and a change in brightness of the preview image, wherein the second and third exposure values are further based on the correlation.

5. The device of claim 4, wherein execution of the instructions for determining the second and third exposure values cause the device to use a look-up table mapping each of a number of exposure values to a corresponding target brightness based on a linear correlation.

6. The device of claim 4, wherein:

$$EV2(\text{settled}) = EV2(\text{initial}) + \frac{|EV1(\text{settled}) - EV1(\text{initial})|}{|TB1 - IB1|} * (TB2 - IB2),$$

wherein:
- EV2(settled) is the second exposure value;
- EV2(initial) is an initial exposure value of the preview image when measuring the initial brightness of the second grouping;
- EV1(settled) is the first exposure value;
- EV1(initial) is the initial exposure value of the preview image when measuring the initial brightness of the first grouping;
- TB1 is the target brightness for the reference image;
- IB1 is the initial brightness of the first grouping of the preview image;
- TB2 is the target brightness for the first non-reference image; and
- IB2 is the initial brightness of the second grouping of the preview image; and $$EV3(\text{settled}) = EV3(\text{initial}) + \frac{|EV1(\text{settled}) - EV1(\text{initial})|}{|TB1 - IB1|} * (TB3 - IB3),$$

wherein:
- EV3(settled) is the third exposure value;
- EV3(initial) is an initial exposure value of the preview image when measuring the initial brightness of the second grouping;
- EV1(settled) is the first exposure value;
- EV1(initial) is the initial exposure value of the preview image when measuring the initial brightness of the first grouping;
- TB1 is the target brightness for the reference image;
- IB1 is the initial brightness of the first grouping of the preview image;
- TB3 is the target brightness for the second non-reference image; and
- IB3 is the initial brightness of the third grouping of the preview image.

7. The device of claim 1, wherein execution of the instructions for determining the second exposure value prevents the device from capturing a previous instance of the first non-reference image before determining the second exposure value.

8. A method for generating a High-Dynamic Range (HDR) image, comprising:
- dividing a preview image captured with an initial exposure value by a camera into at least a first grouping, a second grouping, and a third grouping;
- measuring a first initial brightness of the first grouping;
- measuring a second initial brightness of the second grouping;
- measuring a third initial brightness of the third grouping;
- determining a first exposure value for capturing a reference image, wherein the first exposure value is based on the first initial brightness and a first target brightness for the reference image;
- determining a second exposure value for capturing a first non-reference image, wherein the second exposure value is based on the second initial brightness and a second target brightness for the first non-reference image;
- determining a third exposure value for capturing a second non-reference image, wherein the third exposure value is based on the third initial brightness and a third target brightness for the second non-reference image;
- capturing the reference image using the first exposure value;
- capturing the first non-reference image using the second exposure value;
- capturing the second non-reference image using the third exposure value; and
- blending the reference image, the first non-reference image, and the second non-reference image to generate an HDR image.

9. The method of claim 8, wherein:
- the first exposure value is greater than the second exposure value and greater than the third exposure value; or
- the first exposure value is less than the second exposure value and less than the third exposure value.

10. The method of claim 8, wherein dividing the preview image comprises:
- determining a first threshold and a second threshold of a brightness scale for the preview image, wherein the first threshold and the second threshold are used to divide the brightness scale into a first brightness range associated with the reference image, a second brightness range associated with the first non-reference image, and a third brightness range associated with the second non-reference image;
- comparing brightness for portions of the preview image with the first threshold and the second threshold;
- separating the portions of the preview image into the first grouping, the second grouping, and the third grouping based on the comparison.

11. The method of claim 8, further comprising:
- determining a correlation between a change in exposure value of the preview image and a change in brightness of the preview image, wherein the second and third exposure values are further based on the correlation.

12. The method of claim 11, wherein:

$$EV2(\text{settled}) = EV2(\text{initial}) + \frac{|EV1(\text{settled}) - EV1(\text{initial})|}{|TB1 - IB1|} * (TB2 - IB2),$$

wherein:
- EV2(settled) is the second exposure value;
- EV2(initial) is an initial exposure value of the preview image when measuring the initial brightness of the second grouping;
- EV1(settled) is the first exposure value;
- EV1(initial) is the initial exposure value of the preview image when measuring the initial brightness of the first grouping;
- TB1 is the target brightness for the reference image;
- IB1 is the initial brightness of the first grouping of the preview image;
- TB2 is the target brightness for the first non-reference image; and
- IB2 is the initial brightness of the second grouping of the preview image; and $$EV3(\text{settled}) = EV3(\text{initial}) + \frac{|EV1(\text{settled}) - EV1(\text{initial})|}{|TB1 - IB1|} * (TB3 - IB3),$$

wherein:
- EV3(settled) is the third exposure value;
- EV3(initial) is an initial exposure value of the preview image when measuring the initial brightness of the second grouping;
- EV1(settled) is the first exposure value;
- EV1(initial) is the initial exposure value of the preview image when measuring the initial brightness of the first grouping;
- TB1 is the target brightness for the reference image;
- IB1 is the initial brightness of the first grouping of the preview image;
- TB3 is the target brightness for the second non-reference image; and
- IB3 is the initial brightness of the third grouping of the preview image.

13. The method of claim 8, wherein determining the second exposure value comprises:
preventing capture of a previous instance of the first non-reference image before determining the second exposure value.

14. A non-transitory computer-readable medium storing one or more programs containing instructions that, when executed by one or more processors of a device, cause the device to generate high-dynamic range (HDR) images by performing operations comprising:
dividing a preview image captured with an initial exposure value by a camera into at least a first grouping, a second grouping, and a third grouping;
measuring a first initial brightness of the first grouping;
measuring a second initial brightness of the second grouping;
measuring a third initial brightness of the third grouping;
determining a first exposure value for capturing a reference image, wherein the first exposure value is based on the first initial brightness and a first target brightness for the reference image;
determining a second exposure value for capturing a first non-reference image, wherein the second exposure value is based on the second initial brightness and a second target brightness for the first non-reference image;
determining a third exposure value for capturing a second non-reference image, wherein the third exposure value is based on the third initial brightness and a third target brightness for the second non-reference image;
capturing the reference image using the first exposure value;
capturing the first non-reference image using the second exposure value;
capturing the second non-reference image using the third exposure value; and
blending the reference image, the first non-reference image, and the second non-reference image to generate an HDR image.

15. The non-transitory computer-readable medium of claim 14, wherein execution of the instructions for dividing the preview image causes the device to:
determine a first threshold and a second threshold of a brightness scale for the preview image, wherein the first threshold and the second threshold are used to divide the brightness scale into a first brightness range associated with the reference image, a second brightness range associated with the first non-reference image, and a third brightness range associated with the second non-reference image;
compare brightness for pieces of the preview image to the first threshold and the second threshold;
separate the pieces of the preview image into the first grouping, the second grouping, and the third grouping based on the comparison.

16. The non-transitory computer-readable medium of claim 15, wherein execution of the instructions further causes the device to determine a correlation between a change in exposure value of the preview image and a change in brightness of the preview image, wherein the second exposure value is further based on the correlation and the third exposure value is further based on the correlation.

17. The non-transitory computer-readable medium of claim 14, wherein:
the first exposure value is greater than the second exposure value and greater than the third exposure value; or
the first exposure value is less than the second exposure value and less than the third exposure value.

18. A device configured to generate a High-Dynamic Range (HDR) image, comprising:
means for dividing a preview image captured with an initial exposure value by a camera into at least a first grouping, a second grouping, and a third grouping;
means for measuring a first initial brightness of the first grouping;
means for measuring a second initial brightness of the second grouping;
means for measuring a third initial brightness of the third grouping;
means for determining a first exposure value for capturing a reference image, wherein the first exposure value is based on the first initial brightness and a first target brightness for the reference image;
means for determining a second exposure value for capturing a first non-reference image, wherein the second exposure value is based on the second initial brightness and a second target brightness for the first non-reference image;
means for determining a third exposure value for capturing a second non-reference image, wherein the third exposure value is based on the third initial brightness and a third target brightness for the second non-reference image;

means for capturing the reference image using the first exposure value;

means for capturing the first non-reference image using the second exposure value;

means for capturing the second non-reference image using the third exposure value; and means for blending the reference image, the first non-reference image, and the second non-reference image to generate an HDR image.

19. The device of claim 18, wherein:

the first exposure value is greater than the second exposure value and greater than the third exposure value; or the first exposure value is less than the second exposure value and less than the third exposure value.

\* \* \* \* \*